United States Patent
Lin

(10) Patent No.: US 8,277,032 B2
(45) Date of Patent: *Oct. 2, 2012

(54) ACIDIC GROUP-CONTAINING SOLID INKS

(75) Inventor: Pinyen Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 162 days.

This patent is subject to a terminal disclaimer.

(21) Appl. No.: 12/850,711

(22) Filed: Aug. 5, 2010

(65) Prior Publication Data

US 2012/0033008 A1   Feb. 9, 2012

(51) Int. Cl.
*B41J 2/175* (2006.01)

(52) U.S. Cl. ......................................................... 347/88

(58) Field of Classification Search .................... 347/20, 347/88, 99, 100
See application file for complete search history.

(56) References Cited

U.S. PATENT DOCUMENTS

| | | | |
|---|---|---|---|
| 4,490,731 A | 12/1984 | Vaught | |
| 4,830,671 A | 5/1989 | Frihart et al. | |
| 4,889,560 A | 12/1989 | Jaeger et al. | |
| 4,889,761 A | 12/1989 | Titterington et al. | |
| 5,053,079 A | 10/1991 | Haxell et al. | |
| 5,194,638 A | 3/1993 | Frihart et al. | |
| 5,221,335 A | 6/1993 | Williams et al. | |
| 5,372,852 A | 12/1994 | Titterington et al. | |
| 5,597,856 A | 1/1997 | Yu et al. | |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,918 A | 10/1998 | Titterington et al. | |
| 5,830,942 A | 11/1998 | King et al. | |
| 5,919,839 A | 7/1999 | Titterington et al. | |
| 6,001,901 A | 12/1999 | Shiobara et al. | |
| 6,053,608 A * | 4/2000 | Ishii et al. | 347/88 |
| 6,174,937 B1 | 1/2001 | Banning et al. | |
| 6,255,432 B1 | 7/2001 | Evans et al. | |
| 6,309,453 B1 | 10/2001 | Banning et al. | |
| 6,547,380 B2 | 4/2003 | Smith et al. | |
| 6,858,070 B1 | 2/2005 | Wong et al. | |
| 7,604,336 B2 * | 10/2009 | Leighton | 347/88 |
| 2003/0127021 A1 | 7/2003 | Brown | |

OTHER PUBLICATIONS

U.S. Appl. No. 12/830,578, filed Jul. 6, 2010 to Pinyen Lin.
U.S. Appl. No. 12/830,489, filed Jul. 6, 2010 to Pinyen Lin.
U.S. Appl. No. 12/850,874, filed Aug. 5, 2010 to Pinyen Lin.
U.S. Appl. No. 12/850,718, filed Aug. 5, 2010 to Pinyen Lin.
U.S. Appl. No. 12/850,711, filed Aug. 5, 2010 to Pinyen Lin.
P. Dario et al., "Micro-systems in biomedical applications," J. Micromech. Microeng., vol. 10, pp. 235-244, IOP Publishing Ltd, UK (2000).

(Continued)

*Primary Examiner* — An Do
(74) *Attorney, Agent, or Firm* — Oliff & Berridge, PLC

(57) ABSTRACT

A microfluidic device includes a first substrate, and a phase change ink deposited on a surface of the first substrate. The phase change ink includes an ink vehicle including a polymeric material having one or more acidic groups, and an optional colorant, wherein the phase change ink is solid at room temperature but is liquid at a jetting temperature of from about 60 to about 150° C., and an acidic group mass percentage, measured as a total mass of acid groups to an entire weight of the ink, is from about 1% to about 35%.

20 Claims, 2 Drawing Sheets

OTHER PUBLICATIONS

K. L. Davis et al., "Electron-Transfer Kinetics of Covalently Attached Cytochrome c/SAM/Au Electrode Assemblies," J. Phys. Chem. C, 112, 6571-6576 (2008).

B. T. Houseman et al., "Peptide chips for the quantitative evaluation of protein kinase activity," Nat. Biotechnol., 20, 270-274 (2002).

G. V. Kaigala et al., "Rapid Prototyping of MicrofluidicDevices with a Wax Printer," Lab Chip, 7, 384-387 (2007).

A. Khademhosseini et al., "Interplay of biomaterials and microscale technologies for advancing biomedical applications," J. Biomater. Sci. Polymer Edn, vol. 17, No. 11, pp. 1221-1240, VSP (2006).

S. Le Crom et al., "DNA Microarray Principle," available at http://transcriptome.ens.fr/sgdb/presentation/principle.php (2004).

M. R McNeely et al., "Hydrophobic Microfluidics" Proc. SPIE vol. 3877, p. 210-220 (1999).

P. M. Turberg et al., "Semifluorinated hydrocarbons Primitive surfactant molecules," J. Am. Chem. Soc., 110, 7797 (1988).

W. Wang et al., "Printing MEMS: From a Single Flexible Polyimide Filmto 3D Integrated Microfluidics," 2008 IEEE Hilton Head Sensor and Actuator Workshop (2008).

* cited by examiner

ACIDIC GROUP-CONTAINING SOLID INKS

TECHNICAL FIELD

Described herein are inks such as solid phase change or hot melt inks that may be used in a number of copying and printing devices. More particularly, described herein are solid phase change inks that include acidic functional groups, and their use in biomedical applications.

RELATED APPLICATIONS

Commonly assigned U.S. patent application Ser. No. 12/850,874 entitled "Hydroxyl Group-Containing Solid Inks"), filed concurrently herewith, describes a microfluidic device comprising: a first substrate, and a phase change ink deposited on a surface of the first substrate, the phase change ink comprising an ink vehicle comprising a polymeric material having one or more hydroxyl groups, and an optional colorant, wherein the phase change ink is solid at room temperature but is liquid at a jetting temperature of from about 60 to about 150° C., and a hydroxyl group mass percentage, measured as a total mass of hydroxyl groups to an entire weight of the ink, is from about 1% to about 35%.

Commonly assigned U.S. patent application Ser. No. 12/850,718 entitled "Non-Polar Solid Inks For Biomedical Applications"), filed concurrently herewith, describes a microfluidic device comprising: a first substrate, and a phase change ink deposited on a surface of the first substrate, the phase change ink comprising a non-polar polymeric material and an optional colorant, wherein the phase change ink is solid at room temperature but is liquid at a jetting temperature of from about 60 to about 150° C., and a water contact angle on the deposited phase change ink is from 90° to about 175°.

Commonly assigned U.S. patent application Ser. No. 12/830,578, filed Jul. 6, 2010, discloses a microfluidic device comprising a plurality of substrate layers having desired patterns, wherein each of the substrate layers are aligned and bonded together by a solid adhesive thin film, the plurality of substrate layers comprise pure metal substrates, metal-polymer bi-layer substrates, metal-polymer-metal tri-layer substrates, thermosetting adhesive-polymer bilayer substrates, thermosetting adhesive-polymer-thermosetting adhesive trilayer substrates, thermoplastic adhesive-polymer bilayer substrates, and thermoplastic adhesive-polymer-thermoplastic adhesive trilayer substrates, and the patterns are printed and processed using a conventional printing apparatus.

The appropriate components and process aspects of the foregoing, such as the dispersant materials, may be selected for the present disclosure in embodiments thereof. The entire disclosure of the above-mentioned application is totally incorporated herein by reference.

BACKGROUND

Ink jetting devices are well known in the art. As described in U.S. Pat. No. 6,547,380, ink jet printing systems are generally of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. There are generally three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

Ink jet printing processes may employ inks that are solid at room temperature and liquid at elevated temperatures. Such inks may be referred to as hot melt inks or phase change inks. For example, U.S. Pat. No. 4,490,731 discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Pigmented phase change ink compositions that include various dispersants are known. For example, pigmented phase change ink compositions are disclosed in U.S. Patent Publication No. 2003/0127021 and U.S. Pat. Nos. 5,053,079, 5,221,335, and 6,001,901.

Microfluidics is an area of microfabrication that focuses on the manipulation of liquids and gases in channels with cross-sectional dimensions ranging from a few nanometers to hundreds of micrometers. Microfluidics is a rapidly growing technology impacting a number of research areas including chemical sciences, biomedical research, and drug discovery. Applications include but are not limited to genomics, proteomics, pharmaceutical research, processing of nucleic acids, forensic analysis, cellular analysis, and environmental monitoring, among others.

One of the primary focuses of microfluidic technology is directed toward making increasingly complex systems of channels with greater sophistication and fluid-handling capabilities.

Some of the first microfluidic devices were fabricated using conventional techniques that originated from the microelectronics and integrated circuit industry. Such devices were typically made in glass, silicon or quartz. Processes that were originally designed for microelectronics, such as standard photolithographic methods, were then applied to glass or silicon substrates in order to build two-dimensional channel networks for sample transport, separation, mixing and detection systems on a monolithic chip. For example, to illustrate an example of an earlier process for microfluidic device fabrication based on silicon and glass substrates, a mask is prepared having both transparent and opaque regions that are patterned as a negative image of the desired channel design. A UV-light source transfers a design from the mask to a photoresist (analogous to photographic film) that was previously deposited on the substrate using traditional spin-coating methods. The photoresist is then developed in a solvent that selectively removes either the exposed or the unexposed regions. The open areas are then chemically etched into the substrate, whereby the etching time, etching conditions and crystalline orientation of the substrate control the depth of the channels and the shape of the sidewalls, respectively. Finally, the photoresist is removed and the channel system is closed by thermally bonding the patterned substrate to a cover plate. More complex, three-dimensional systems can then be built by bonding several of these patterned layers together.

Although the above described microfluidic device fabrication and layering process based on glass and silicon substrates has some benefits, it also embodies several limitations that include, but are not limited to: (1) material limitations related to the use of glass substrates; (2) material costs; (3) the many processing steps involved; (4) limitations in geometrical design due to the isotropicity of the etching process; and (5) surface chemistry limitations with respect to silicon substrates. Furthermore, typical microfluidic devices require cleanroom facility and expensive MEMS/semiconductor microfabrication equipment to build.

Microarrays is another area of microfabrication that focuses on the preparation of a substrate with patterned or random reaction sites. Complex lithography techniques are also generally used for forming such microarrays. The microarrays are important, for example, in such areas as biomedical research, drug discovery, sample analysis, sensor design, and the like.

Thus, there is a need for a method of fabricating microfluidic devices and microarrays that overcomes these limitations and, in particular, eliminates the need of expensive microlithography equipment to perform the processing, and is relatively inexpensive.

The disclosures of each of the foregoing patents and publications are hereby incorporated by reference herein in their entireties. The appropriate components and process aspects of the each of the foregoing patents and publications may also be selected for the present compositions and processes in embodiments thereof.

SUMMARY

While known compositions and processes are suitable for their intended purposes, a need remains for improved methods for making microfluidic and related devices such as microarrays. A need also remains for alternative compositions for making such microfluidic and related devices.

The present disclosure addresses these and other needs, by providing solid phase change inks that include acidic functional groups, methods of making these inks, and methods for using these inks in biomedical applications.

In embodiments, the disclosure provides a microfluidic device comprising:
a first substrate, and
a phase change ink deposited on a surface of the first substrate, the phase change ink comprising an ink vehicle comprising a polymeric material having one or more acidic groups, and an optional colorant,
wherein the phase change ink is solid at room temperature but is liquid at a jetting temperature of from about 60 to about 150° C., and
an acidic group mass percentage, measured as a total mass of acid groups to an entire weight of the ink, is from about 1% to about 35%.

EMBODIMENTS

Figure 1:
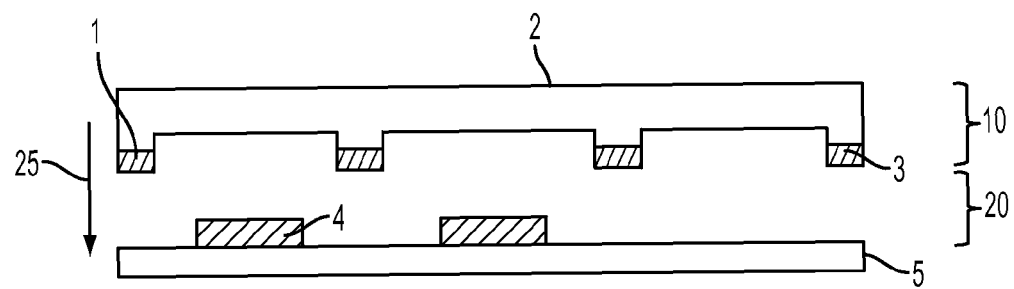
FIGS. 1 and 2 show embodiments of a microfluidic structure according to the present disclosure.

This disclosure is not limited to particular embodiments described herein, and some components and processes may be varied by one of ordinary skill in the art, based on this disclosure. The terminology used herein is for the purpose of described particular embodiments only, and is not intended to be limiting.

Ink Compositions

Ink compositions of the present disclosure are based on conventional solid or phase change inks, but are modified to provide the chemistry desired for particular applications. For example, for biomedical applications such as microfluidic devices and related devices such as microarrays and the like, a functional surface capable of reacting with the biological species is often needed. However, conventional ink formulations contain such components as non-polar waxes, amides, and esters. These components are typically added to ink formulations for better clarity, dye solubility, color stability, mechanical strength, and the like, but such properties are not required in many biomedical applications where the ink does not need to include a dye or a pigment, and the functional requirements of the ink are quite different that for inks for image printing.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cP), for example from about 5 to about 15 cP or from about 8 to about 12 cP, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 cP such as from about 5 to about 15 cP, for example from about 8 to about 12 cP, at a jetting temperature of from about 60 to about 125° C. such as from about 80 to about 125° C., for example from about 100 to about 120° C.

High energy inks are solid at a temperature below about 40° C. and have a viscosity of from about 5 to about 15 cP at a jetting temperature of from about 100 to about 180° C., for example from about 120 to about 160° C. or from about 125 to about 150° C.

Ink Vehicle

The term "ink vehicle" generally refers to the material that carries the other components of the ink. Any suitable ink vehicle can be employed, so long as the ink vehicle is non-aqueous. As for the phase change ink (or sometimes called solid ink), the ink is deposited on the media substrate while the ink is in a melted or liquid form. After ejection of the ink, the ink image is cooled down to room temperature and becomes solid. This is why it is called phase change ink—the ink changes from the liquid phase into solid phase. For phase change ink, the ink vehicle generally includes transparent, low melt polymers that carrier the colorants. For example, the ink vehicle can be a wax or a non-polar polymer. Suitable vehicles can include paraffins, microcrystalline waxes, polyethylene waxes, ester waxes, amides, long chain acids with at least about 30 carbons, fatty acids and other waxy materials, fatty amide containing materials, sulfonamide materials, resinous materials made from different natural sources (tall oil rosins and rosin esters, for example), and many synthetic resins, oligomers, polymers, and copolymers such as those further discussed below.

Examples of suitable amides include, for example, diamides, triamides, tetra-amides, cyclic amides and the like. Suitable triamides include, for example, those disclosed in U.S. Patent Publication No. 2004-0261656, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, the entire disclosures of each are incorporated herein by reference.

Other suitable vehicle materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like. Further information on isocyanate-derived vehicle materials is disclosed in, for example, U.S. Pat. Nos. 5,750,604, 5,780,528, 5,782,966, 5,783,658, 5,827,918, 5,830,942, 5,919,839, 6,255,432, and 6,309,453, the entire disclosures of each of which are incorporated herein by reference.

Examples of suitable ink vehicles include, for example, ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

In these embodiments, the ink vehicle comprises, or consists of, compounds having acidic groups, and desirably terminal acidic groups. Suitable compounds that have essentially non-reactive polymer chains but terminal acidic groups are polyolefins with acidic end groups. Such polyolefins with acidic end groups generally have a melting point of from about 50 to about 150° C., such as from about 70 to about 120° C. or from about 88 to about 110° C., and a number-average molecular weight (Mn) range of from about 100 to about 5,000, such as from about 200 to about 2,500 or from about 300 to about 1,500. Commercial examples include the UNICID® materials such as UNICID® 350, UNICID® 550, and UNICID® 700, available from Baker Hughes Petrolite.

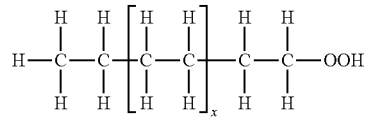

These materials are polyolefins with acidic end groups and have an average chain length of from about 24 to about 50 carbon atoms. Other polyolefins having terminal acidic groups may also be used. For example, low molecular weight polypropylene and branched polyolefins are also suitable for use when they contain terminal acidic groups. Other oxidized, hydrocarbons such as PETRONAUBA® C (oxidized polymer) and CARDIS® oxidized polymers can also be useful for this application. However, these oxidized hydrocarbons tend to have a mixture of acidic groups, ester groups and hydroxyl groups, and thus may not be as desired for embodiments where particular chemistry and binding control is required. The oxidized polymers can thus be used, for example, when the mixture of functional groups are not affecting the specific application. In addition, if desired, a mixture of materials can be used so as to tailor the hydroxyl content of the ink.

Urethane derivatives of oxidized synthetic or petroleum waxes, such as those available from Baker Petrolite and of the general formulas

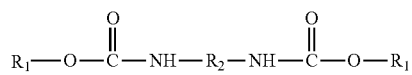

wherein $R_1$ is an alkyl group of the formula $CH_3(CH_2)_n$, n is an integer of from about 5 to about 200, for example from about 10 to about 150 or from about 10 to about 100 and $R_2$ is an arylene group, may also be used as the ink vehicle. These materials may have a melting point of from about 60° C. to about 120° C., such as from about 70° C. to about 100° C. or from about 70° C. to about 90° C. Commercial examples of such materials include, for example, Baker Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE 185 and BE SQUARE 195, with number-average molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR materials available from Baker Petrolite, including VYBAR 253 (Mn=520), VYBAR 5013 (Mn=420), and the like, may also be used. In addition, the ink vehicle may be an ethoxylated alcohol, such as available from Baker Petrolite and of the general formula

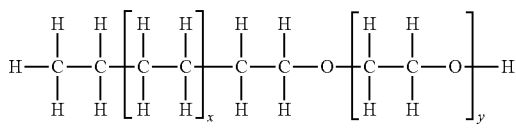

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60 to about 150° C., such as from about 70 to about 120° C. or from about 80 to about 110° C. and a number-average molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX® 520 (Mn=700), UNITHOX® 550 (Mn=1,100), UNITHOX® 720 (Mn=875), UNITHOX® 750 (Mn=1,400), and the like.

As an additional example, the ink vehicle may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

High molecular weight linear alcohols, such as those available from Baker Petrolite and of the general formula

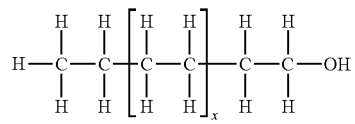

wherein x is an integer of from about 1 to about 50, such as from about 5 to about 35 or from about 11 to about 23, may also be used as the ink vehicle. These materials may have a melting point of from about 50 to about 150° C., such as from about 70 to about 120° C. or from about 75 to about 110° C., and a number-average molecular weight (Mn) range of from about 100 to about 5,000, such as from about 200 to about 2,500 or from about 300 to about 1,500. Commercial examples include the UNILIN® materials such as UNILIN® 350 (Mn=375), UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

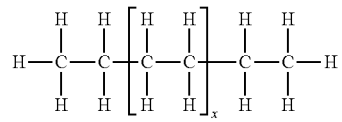

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Other examples of materials having one or multiple acidic groups that can be used in the ink vehicle include: polyesters or polyethers containing one, two, three, four or more unreacted acidic groups; poly(meth)acrylic acid; polystyrene sulfonic acid; sulfonated polymers; phosphorylated proteins or peptides; phosphorylated synthetic polymers; sulfated polysaccharides; sulfated glycoproteins; polyaspartic acid; polyglutamic acid; polyaspartate; polyvinyl phosphate; polyvinyl phosphonate; and the like. Accordingly, the acidic groups present in the polymeric material can be carboxylic acid groups, sulfonic acid groups, phosphonic acid groups, and the like.

The ink vehicle may comprise one or more of the aforementioned suitable materials.

However, in embodiments, reactivity of the printed substrate is desirably particularly controlled by controlling the materials used in the ink and the reactivity of those materials. Thus, for example, for printing a reactive microarray where reactivity is provided by acidic functional groups, it is desired that the ink composition not contain materials that have other functionalities. Instead, it is desired in such embodiments that the ink vehicle include materials whose only functionality is the presence of acidic groups, such as terminal acidic groups, and not include other reactive functionalities such as ester groups, amide, groups, hydroxyl groups, or the like.

Other suitable materials having one or more acidic groups, such as terminal acidic groups, may also be used for the ink vehicle. For example, fluorinated varieties of the above-described materials may also be used. In addition, if desired, a mixture of materials can be used so as to tailor the properties of the ink such as hydrophobicity, viscosity, and the like.

In embodiments, one or more, such as two, three, four, or more different materials having one or more acidic groups, such as terminal acidic groups, can be used as the ink vehicle. For example, the ink vehicle can comprise: two or more different non-fluorinated acid group-containing materials; one or more different acid group-containing, non-fluorinated materials and one or more different acid group-containing, fluorinated materials; or the like. In still other embodiments, the acid group-containing materials can be used in combination with one or more other materials such as one or more polymers not containing any acid groups.

However, despite the materials used to form the ink composition, it is desired in embodiments that the ink contain sufficient acid group-containing materials to provide a desired level of acid groups in the ink. For example, the ink in embodiments has an acid group mass percentage of from about 1% or about 2% to about 20%, about 30%, or about 35%, where the mass percentage is measured as the total mass of acid groups to the entire weight of the ink.

The ink vehicles for the phase change inks may have melting points of from about 60 to about 150° C., for example from about 80 to about 120° C. or from about 85 to about 110° C., as determined by, for example, observation and measurement on a microscope hot stage, wherein the binder material is heated on a glass slide and observed by microscope. Higher melting points are also acceptable, although printhead life may be reduced at temperatures higher than 150° C.

In addition, the surface tension of the ink at the operating (jetting) temperature of the ink should be from about 20 to about 40 dynes per centimeter, for example from about 40 to about 65 dynes per centimeter, to enhance refill rates and color mixing. The operating, or jetting, temperatures of the phase change inks generally are from about 60 to about 150° C. The viscosity of the ink at the operating temperature of the ink is generally from about 1 to about 20 cP, for example from about 1 to about 15 cP or from about 5 to about 15 cP. For example, the viscosity of the ink at an operating temperature of about 120° C. or more can be about 10 cP or less.

The ink composition as a whole generally includes the ink vehicle (that is, exclusive of any desired colorants, additives, and the like) in an amount of from about 25% to about 99.5% by weight of the ink, for example from about 30% to about 90% or from about 50% to about 85% by weight of the ink.

The ink vehicle components, such as the non-polar polymers, are desirably selected such that the printed ink provides a high contact angle on the substrate. Thus, for example, the printed ink provides a water contact angle (that is, the contact angle of water on the imaged ink) of at least about 90°. The water contact angle can be, for example, from about 90° or greater than 90° or from about 100° or from about 110° to about 155° or about 165° or about 175°.

Colorant

The phase change inks of the disclosure may optionally contain at least one colorant. Although conventional phase change inks typically contain colorants, colorants may not be required in biomedical applications, and thus the colorant and any necessary dispersants and the like may be omitted to simplify the ink composition. However, one or more colorants can be included, for example, where it is desirable to visually identify the printed structures. When so included, the colorant can be a pigment, a dye, a combination of pigments, a combination of dyes, a combination of pigments and dyes, or the like. The colorant can be visually colored (such as cyan, magenta, yellow, black, or the like) or can be colored at other wavelengths (such as ultraviolet).

Any suitable conventional or after-developed colorant can be used, as desired, in conventional and known amounts. If necessary or desirable, a dispersant can also be included to help disperse the colorant in the ink vehicle.

Other Components in the Ink

Optionally, a propellant may be contained in the phase change ink, although it is not required in many ink compositions. Suitable propellants for the phase change inks, present in any effective amount such as from about 10 to about 90 percent by weight, for example from about 20 to about 50 percent by weight, of the ink generally have melting points of from about 50 to about 150° C., for example from about 80 to about 120° C. In another embodiment, the propellants generally have a boiling point of from about 180 to about 250° C., for example from about 200 to about 230° C. Further, the surface tension of the propellant in its liquid state at the operating temperature of the ink may be from about 20 to about 65 dynes per centimeter, for example from about 40 to about 65 dynes per centimeter, to enhance refill rates, paper wetting, and color mixing. In addition, the propellants ideally have a viscosity at the operating temperature of the ink of from about 1 to about 20 cP, for example from about 1 to about 5 centipoise, to enhance refill and jettability. The propellant may also be thermally stable in its molten state so that it does not undergo decomposition to yield gaseous products or to form heater deposits.

The ink can also contain an antioxidant. The antioxidants of the ink compositions protect the ink components from oxidation during the heating portion of the ink preparation and jetting processes. Specific examples of suitable antioxidants are set forth in U.S. Pat. No. 6,858,070, the disclosure of which is totally incorporated herein by reference. When present, the optional antioxidant is present in the ink in any desired or effective amount, in one embodiment of at least about 0.01% by weight of the ink vehicle, in another embodiment of at least about 0.1% by weight of the ink vehicle, and in yet another embodiment of at least about 1% by weight of the ink vehicle, and in one embodiment of equal to or less than about 20% by weight of the ink vehicle, in another embodiment equal to or less than about 5% by weight of the ink vehicle, and in yet another embodiment equal to or less than about 3% by weight of the ink vehicle, although the amount can be outside of these ranges. When only one antioxidant is used, a hindered amine is preferred, e.g.: Naugard 445 antioxidant (obtained from Uniroyal Chemical Co., Middlebury, Conn. or Crompton Corporation). In other embodiments, mixtures of antioxidants used to improve melt processing stability and long-term thermal stability include, but are not limited to, hindered amines, phosphites, hindered phenols, hydroxylamines, lactones, tocopherols, thiosynergists, and the like.

The inks of embodiments may further include conventional additives to take advantage of the known functionality associated with such conventional additives. Such additives may include, for example, defoamers, slip and leveling agents, plasticizers, pigment dispersants, etc.

Other optional additives such as plasticizers may be present in the inks. Plasticizers that may be used include pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), and the like, may be added to the ink vehicle, and may constitute from about 0.5 to 20 percent of the ink vehicle component of the ink. Plasticizers can either function as the ink vehicle or can act as an agent to provide compatibility between the ink propellant, which generally is polar, and the ink vehicle, which generally is non-polar.

Preparation of the Ink

The phase change ink can be prepared by any suitable process for mixing the various components together, and the preparation process is not particularly limited. For example, the ink components can be mixed in a high shear melt mixer at a temperature above the melting points of the constituent polymers.

Use of the Ink

Printed images may be generated with the inks described herein by incorporating the ink into a printer cartridge that is used in an ink jet device, for example a thermal ink jet device, an acoustic ink jet device, or a piezoelectric ink jet device, and concurrently causing droplets of the ink to be ejected in an imagewise pattern onto an image receiving substrate such as paper, transparency material, plastic film, glass slide, or the like. The ink is typically included in a reservoir connected by any suitable feeding device to the corresponding ejecting channels of the ink jet head. In the jetting procedure, the ink jet head may be heated, by any suitable method, to the jetting temperature of the inks.

The inks can also be employed in indirect printing ink jet applications, wherein when droplets of the melted ink are ejected in an imagewise pattern onto an image receiving substrate, the substrate is an intermediate transfer member and the ink in the imagewise pattern is subsequently transferred from the intermediate transfer member to a final recording substrate. The intermediate transfer member may be, for example, a drum.

In embodiments using an intermediate transfer member, the member may be heated to have a temperature on a surface thereof of from about 45 to about 80° C. The elevated surface temperature permits the ink to remain in a molten state while avoiding offset or ink splitting on the surface of the transfer member, thereby enabling good transfer of the image to the end image receiving substrate such as paper or transparency.

In embodiments, the ink jet system can include the aforementioned ink alone, or in an ink set comprised of at least two different inks. For example, the ink system can include the aforementioned ink alone, or can include the aforementioned ink in combination with a colored phase change ink whereby the ink of the disclosure can be used to print microarrays or microfluidic devices, and the colored ink can be used to print text, labeling, lines, or the like on the substrate. The system also includes an ink jet device including an ink jet head consisting of one channel for each one of the different phase change inks in the ink set, and a supply path that supplies each of the different phase change inks to the respective channels of the ink jet head, for example from reservoirs containing each of the different phase change inks.

Any suitable substrate or recording sheet can be employed, including plain papers such as XEROX® 4200 papers XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, glass slides, and the like.

It is desirable that the ink has certain attributes that include having good filterability, remain stable over several successive freeze thaw cycles, and have good rheological stability for at least 10 days at 120° C. Furthermore, the inks do not show any significant settling after 7 days at 120° C., or after 14 days at 120° C. The disclosed inks, in embodiments, exhibit Newtonian rheology properties, in addition to improved stability. The disclosed pigmented inks can be printed over a temperature range of about 100° C. to about 150° C., however, it is advantageous to print at relatively lower temperatures to further reduce printing costs by reducing energy consumption.

If desired, the substrate can be first treated prior to imaging with the ink, for example, to cause the imaged ink to adhere better to the substrate. This pre-treatment can be conducted immediately prior to imaging with the ink, or the pre-treatment can be conducted apart from the imaging, such as by providing a substrate that is already pre-treated. Such pre-treatments are well known in the field of biomedical testing and analysis, and any such treatments can be readily implemented in the present disclosure to obtain the desired results. For example, one suitable pre-treatment process to enhance adhesion of the ink to the substrate is to expose the un-imaged substrate to plasma treatment, where ionized radicals such as ionized $O_2$, Ar, He, or the like are reacted with the substrate surface.

Microfluidic and Related Devices

Figure 2:
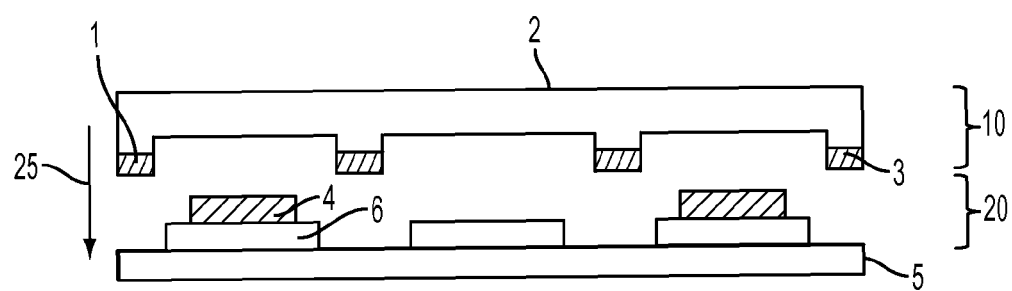

Microfluidic and related devices can be made by a variety of different methods. For example, FIG. 1 illustrates an exemplary Lab-on-a-Print process for three-dimensional microfluidics. As shown in FIG. 1, a desired lithographic pattern 1 is produced by a traditional process in a substrate 2, such as a polymer substrate. Adhesive material 3 is applied to contact portions of the lithographic pattern 1 that will contact an opposing substrate. This forms a top half 10 of a microfluidic structure. A bottom half 20 of a microfluidic structure is fowled by printing the ink compositions described herein, in a desired pattern 4, onto a substrate 5, such as a polymer or glass substrate. Printing can be accomplished by any suitable method, such as by use of an appropriate ink jet printer. The top half 10 and bottom half 20 are then assembled together, such as indicated by arrow 25, to form a final microfluidic structure. An alternative arrangement, shown in FIG. 2, is similar to the structure of FIG. 1, except that the bottom half 20 of the structure includes a metal layer 6 between the substrate 5 and the ink pattern 4.

The ink and printer apparatus incorporating the ink as described herein can also be used to make other micro devices, such as microarrays, useful in a wide range of biomedical applications. For example, the ink and apparatus may be used to print on a substrate for subsequent use as binding sites for biological materials. Such printing can form a continuous film, or can form discrete ordered or random points that function as binding sites. The ink can thus be printed so that the areas with ink can be further modified with functional groups such as epoxy groups ($—C_2H_3O$). The reactions can be extended to the subsequent binding of proteins, DNA, or other biological material to the substrate.

Figure 3:
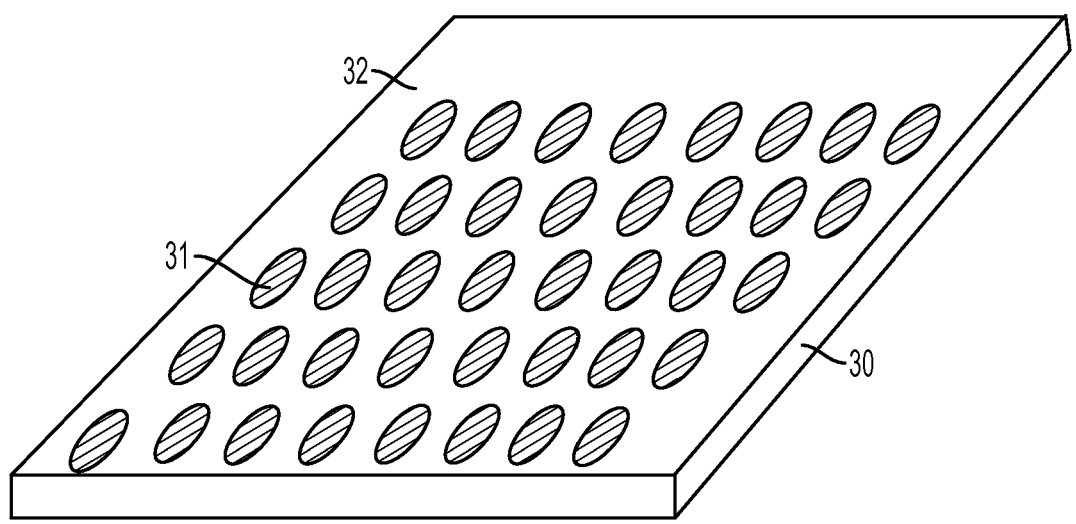
FIG. 3 shows an embodiment of a microarray according to the present disclosure.

FIG. 3 shows an example of formation and use of a microarray. FIG. 3 shows the formation of a microarray that includes a substrate 30. Any suitable and desired printed pattern can be formed on the substrate 30 by printing the ink compositions described herein using a suitable method, such as by use of an appropriate ink jet printer. The pattern can be, for example, a pattern of discontinuous printed regions 31 spaced apart by a continuous non-printed area 32. The acid groups on the surface of the ink can react with a crosslinker with bifunctional groups, where one group reacts with the acid group of the printed ink and the other group can be used to chemically bond biomolecules such as protein and DNA oligomers. Other continuous patterns such as lines can be used in combination with the dots. Other alternatives will be apparent based on the present disclosure.

Thus, for example, when the ink is printed on the substrate, the imaged surface is covered partially or completely with the ink with acid groups. This hydrophilic ink thus creates a surface that can react with aqueous fluids that contain crosslinkers with bifunctional groups. It would chemically modify the ink surface so that the biomolecules such as protein and DNA oligomers will chemically bond to the ink surface. In still other embodiments, the ink can be printed in such a manner as to provide printed structures that form passive valves, gates, mixers, sample dividers, sample consolidators, or the like that control fluid flow.

In these embodiments, the ink area can create favorable aqueous fluidic paths so that the fluid can flow preferably in the ink areas of the microstructure. The fluid can stay in the designated areas for specific mixing and reaction. Likewise, this structure allows for easily making the fluid flow with little or no power, because the surface will attract the fluid to the specific areas. For example, in FIG. 3 where the dots are ink areas, no water-based ink will stay on the dots, and so the fluid will flow by the dots and will be guided in the non-ink areas. This latter structure provides an easy way to confine fluidic drops without a given area but without any structural walls. For example, one can use special micropipettes to deliver special fluid drops on the non-ink area, and the fluid will be restricted in the area without moving to other locations. In FIG. 3, one can cap the special patterns mentioned in FIG. 3 with, for example, substrates and adhesives to make it a 3D structure.

The ink and printer apparatus incorporating the ink as described herein can also be used to make other micro devices, such as microarrays, useful in a wide range of biomedical applications. For example, the ink and apparatus may be used print on a substrate for subsequent use as binding sites for biological materials. Such printing can form a continuous film, or can form discrete ordered or random points that function as binding sites. The acidic groups present in the printed ink thus form immobilization sites for binding proteins, DNA, or other biological material.

When so used, the substrate may be any substrate suitable for the desired use. For example, the substrates as describe above can used, including plain paper, coated papers, transparency materials, fabrics, textile products, plastics, polymeric films, inorganic substrates, glass, and the like. The substrate can be smooth or not, as desired, such as having wells in which the ink is to be printed.

FIG. 3 shows in one non-limiting example the use of a microarray. FIG. 3 shows a microarray that includes a substrate and printed areas of the ink described above. The printed areas are created by ink jetting the ink onto the substrate using a suitable ink jet printer. Once formed, the printed areas include polymer chains with terminal acidic groups, which are capable of binding to biological material, such as protein molecules or the like.

The above examples are not limiting, and it will be understood that many other structures can be made based on the present disclosure. Use of the ink jet printer to deposit the ink allows for easy yet precise placement of the ink on the substrate surface. This is important, for example, for making testing structures and materials for a wide range of uses, such as chemical analysis and biomedical applications.

Embodiments described above will now be further illustrated by way of the following examples. These examples are intended to be illustrative, and the claims are not limited to the materials, conditions, or process parameters set forth in these embodiments.

EXAMPLES

Example 1

The following components are used to make a jettable solid ink, the amounts of which are given as parts by weight unless otherwise stated. An ink concentrate base is prepared by mixing the following components by melting and homogeneously blending them together at 120° C. using an overhead stirrer: 5 parts of a distilled Polyethylene Wax 500 from Baker Petrolite, 86 parts of a Unicid 350 from Baker Petrolite, 9 parts S-180 (a stearyl stearamide) commercially available from Crompton Corporation. A desktop hotplate and a glass container are pre-heated to 120° C. with the ingredients mentioned above. A mechanical stirrer is used to mix the polymer mixture and the speed is adjusted to enough mixing after 30 min. The ink mixture is then discharged and cooled to the room temperature.

The ink is loaded to a Xerox printer Phaser printer. The patterns are generated using post-script format. The patterns include lines, dots, and solid areas (areas covered with ink). The substrate used is polyimide (Kapton made by DuPont), and clear transparency sheets (made by Xerox). The patterns are printed on the substrates and the ink images The contact angle on the ink area is measured using an instrument made by DataPhysics GmbH. The contact angle is 4 degrees. The non-ink area is measured at 60 degrees.

Comparative Example 1

The ink of Comparative Example 1 is then made from an ink pigment concentrate. Specifically, 70.1 g of a molten homogeneous solution of the following components mixture is prepared: 72.98 parts of a distilled Polyethylene Wax from Baker Petrolite, 3.70 parts triamide wax (triamide described in U.S. Pat. No. 6,860,930), 17.11 parts S-180 (a stearyl stearamide) commercially available from Crompton Corporation, 5.20 parts KE-100 resin commercially available from Arakawa Corporation, triglycerides of hydrogenated abietic (rosin) acid, from Arakawa Chemical Industries, Ltd., 0.23 parts Naugard 445 available from Crompton Corporation, and 0.78 parts Solsperse 17000, available from Lubrizol Corporation. This solution is added slowly to 74.9 g of an ink pigment concentrate in an oven at 120° C. while stirring at 400 RPM. The resulting pigmented ink is coarsely filtered at 120° C. past a 6 micron glass fiber filter available commercially from Pall Corporation. Thereupon the ink is filtered through a 1 micron glass fiber filter available commercially from Pall Corporation. The shear rate viscosity at 115° C. is measured on the 1 micron permeate of the ink using cone and plate method on an RFS3 rheometer available from Rheometrics Scientific. The ink is found to be Newtonian and had shear rate viscosities of 10.0 and 9.9 cP at 1 and 100 $s^{-1}$, respectively.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A microfluidic device comprising:
   a first substrate, and
   a phase change ink deposited on a surface of the first substrate, the phase change ink comprising an ink vehicle comprising a polymeric material having one or more acidic groups, and an optional colorant,
   wherein the phase change ink is solid at room temperature but is liquid at a jetting temperature of from about 60 to about 150° C., and
   an acidic group mass percentage, measured as a total mass of acid groups to an entire weight of the ink, is from about 1% to about 35%.

2. The microfluidic device according to claim 1, wherein the polymeric material comprises a polyolefin with at least one terminal acidic group.

3. The microfluidic device according to claim 2, wherein the polymeric material has a melting point of from about 50 to about 150° C.

4. The microfluidic device according to claim 2, wherein the polymeric material has an average chain length of from about 24 to about 50 carbon atoms.

5. The microfluidic device according to claim 2, wherein the polyolefin is selected from the group consisting of branched polyolefins.

6. The microfluidic device according to claim 1, wherein the acidic terminal group of the polymeric material is the only reactive functional group present in the ink.

7. The microfluidic device according to claim 1, wherein the polymeric material comprises an oxidized hydrocarbon.

8. The microfluidic device according to claim 7, wherein the oxidized hydrocarbon includes reactive functional groups in addition to the acidic group.

9. The microfluidic device according to claim 1, wherein the ink has a surface tension of about 20 to about 65 dynes per centimeter, and a viscosity of about 1 to about 20 cP, at the jetting temperature.

10. The microfluidic device according to claim 1, wherein the ink vehicle is present in an amount of from about 25% to about 95% by weight of the ink.

11. The microfluidic device according to claim 1, comprising a second substrate adhered to the first substrate in a thickness direction.

12. The microfluidic device according to claim 11, wherein the microfluidic device comprises fluid flow channels formed between the first substrate and the second substrate, and the phase change ink is printed on a surface of the first substrate to be within at least a portion of the fluid flow channels.

13. The microfluidic device according to claim 1, wherein the first substrate is a polymer, glass, or metal-coated substrate.

14. A microarray comprising:
    a substrate, and
    an image printed on the substrate using a phase change ink comprising an ink vehicle comprising a polymeric material having one or more acidic groups, and an optional colorant,
    wherein the phase change ink is solid at room temperature but is liquid at a jetting temperature of from about 60 to about 150° C., and an acidic group mass percentage, measured as a total mass of acid groups to an entire weight of the ink, is from about 1% to about 35%.

15. The microarray of claim 14, wherein the image comprises a continuous coating of the phase change ink.

16. The microarray of claim 14, wherein the image comprises isolated areas of the ink separated by unimaged areas of the substrate.

17. The microarray of claim 14, wherein the substrate is a polymer, glass, or metal-coated substrate.

18. A method for making a microarray, comprising:
    providing a substrate;
    ejecting droplets of a phase change ink from an ink jet printer onto the substrate, to form an image; and
    allowing the image to solidify,
    wherein the phase change ink comprises an ink vehicle comprising a polymeric material having one or more acidic groups, and an optional colorant,
    the phase change ink is solid at room temperature but is liquid at a jetting temperature of from about 60 to about 150° C., and
    an acidic group mass percentage, measured as a total mass of acid groups to an entire weight of the ink, is from about 1% to about 35%.

19. The method of claim 18, wherein the substrate is pretreated to increase adhesion of the ink to the substrate.

20. The method of claim 18, wherein the image comprises isolated areas of the ink separated by unimaged areas of the substrate.

* * * * *